(12) United States Patent
Reese

(10) Patent No.: US 9,158,439 B2
(45) Date of Patent: Oct. 13, 2015

(54) REMOTE FOCUSING UNIT

(75) Inventor: Charles Reese, Dallas, TX (US)

(73) Assignee: Production Resource Group, LLC, New Windsor, NY (US)

( * ) Notice: Subject to any disclaimer, the term of this patent is extended or adjusted under 35 U.S.C. 154(b) by 2359 days.

(21) Appl. No.: 11/948,976

(22) Filed: Nov. 30, 2007

(65) Prior Publication Data

US 2009/0144646 A1 Jun. 4, 2009

Related U.S. Application Data

(60) Provisional application No. 60/868,255, filed on Dec. 1, 2006.

(51) Int. Cl.
| | |
|---|---|
| *G06F 3/0484* | (2013.01) |
| *H05B 37/02* | (2006.01) |
| *F21L 4/02* | (2006.01) |
| *G06F 3/0488* | (2013.01) |
| *F21W 131/406* | (2006.01) |

(52) U.S. Cl.
CPC .......... *G06F 3/04847* (2013.01); *H05B 37/029* (2013.01); *H05B 37/0272* (2013.01); *B60K 2350/1004* (2013.01); *F21L 4/027* (2013.01); *F21W 2131/406* (2013.01); *G06F 3/04886* (2013.01)

(58) Field of Classification Search
CPC .................. G06F 3/04886; B60K 2350/1004; F21L 4/027; F21W 2131/406
USPC ........... 715/771; 315/316, 312; 362/257, 285, 362/85; 348/211.99, 211.4
See application file for complete search history.

(56) References Cited

U.S. PATENT DOCUMENTS

| | | | | | |
|---|---|---|---|---|---|
| 3,942,175 | A | * | 3/1976 | Collins et al. | 341/29 |
| 4,437,169 | A | * | 3/1984 | Bertenshaw et al. | 315/291 |
| 4,837,665 | A | * | 6/1989 | Hoyer et al. | 362/96 |
| 4,947,302 | A | * | 8/1990 | Callahan | 362/233 |
| 5,406,176 | A | * | 4/1995 | Sugden | 315/292 |
| 5,414,328 | A | * | 5/1995 | Hunt et al. | 315/316 |
| 5,488,433 | A | * | 1/1996 | Washino et al. | 348/722 |
| 5,969,485 | A | * | 10/1999 | Hunt | 315/292 |
| 6,029,122 | A | * | 2/2000 | Hunt | 702/188 |
| 6,175,771 | B1 | * | 1/2001 | Hunt et al. | 700/3 |
| 6,655,817 | B2 | * | 12/2003 | Devlin et al. | 362/233 |
| 6,736,528 | B2 | * | 5/2004 | Hewlett et al. | 362/286 |
| 6,996,424 | B2 | * | 2/2006 | Ijas et al. | 455/575.1 |
| 7,136,077 | B2 | * | 11/2006 | D'Amora et al. | 345/601 |
| 7,249,325 | B1 | * | 7/2007 | Donaldson | 715/777 |
| 7,266,777 | B2 | * | 9/2007 | Scott et al. | 715/762 |
| 7,355,523 | B2 | * | 4/2008 | Sid | 340/9.16 |
| 7,367,006 | B1 | * | 4/2008 | O'Riordan et al. | 716/102 |

(Continued)

FOREIGN PATENT DOCUMENTS

| | | | | |
|---|---|---|---|---|
| GB | 2076180 A | * | 11/1981 | G05B 15/02 |
| KR | 2005074667 | * | 1/2004 | |

*Primary Examiner* — Ece Hur

(74) *Attorney, Agent, or Firm* — Law Office of Scott C. Harris, Inc.

(57) ABSTRACT

A remote-control device which allows remotely controlling parameters of a light via a console. The console actually does the controlling, but the remote-control device enables control of the light parameters by sending the information to the console. For example, the remote can be used to control preset values or to control other aspects of the console. The console may store presets associated with focus, and those presets can be changed from the remote.

17 Claims, 4 Drawing Sheets

(56) References Cited

U.S. PATENT DOCUMENTS

| | | | |
|---|---|---|---|
| 7,388,578 B2* | 6/2008 | Tao | 345/173 |
| 7,402,743 B2* | 7/2008 | Clark et al. | 84/615 |
| 7,748,878 B2* | 7/2010 | Lee | 362/386 |
| 8,053,993 B2* | 11/2011 | Brockmann | 315/149 |
| 8,706,310 B2 | 4/2014 | Barrilleaux | 700/291 |
| 2002/0070689 A1* | 6/2002 | Hunt et al. | 315/312 |
| 2005/0057543 A1* | 3/2005 | Hunt et al. | 345/204 |
| 2005/0086589 A1* | 4/2005 | Hunt | 715/505 |
| 2005/0094635 A1* | 5/2005 | Hunt | 370/389 |
| 2006/0288300 A1* | 12/2006 | Chambers et al. | 715/744 |
| 2007/0145915 A1* | 6/2007 | Roberge et al. | 315/312 |
| 2007/0268680 A1* | 11/2007 | Lee | 362/85 |
| 2008/0162064 A1* | 7/2008 | Lee et al. | 702/81 |
| 2010/0067244 A1* | 3/2010 | Cartwright | 362/386 |

* cited by examiner

REMOTE FOCUSING UNIT

This application claims priority from U.S. provisional application No. 60/868,255, filed Dec. 1, 2006, the disclosure of which is herewith incorporated by reference.

BACKGROUND

Stage lighting systems use a console, such as Production Resource Group's Virtuoso™ console, to control parameters of a number of remotely controllable lamps. It is often important to test certain functions on these lamps. Often this is done using a console that can remotely control the operations of these lamps.

Focusing of these lamps may be important. Each lamp is hung in a location, and a preset focus may be associated with that location.

SUMMARY

The present invention describes a remote focus unit that allows wireless or other network control over lamp focus.

An aspect of the embodiments describe using the remote to change focus presets.

BRIEF DESCRIPTION OF THE DRAWINGS

These and other aspects will now be described in detail with reference to the accompanying drawings, wherein.

DETAILED DESCRIPTION

The present application describes a technique of remote access and or control of lighting consoles.

Figure 1:
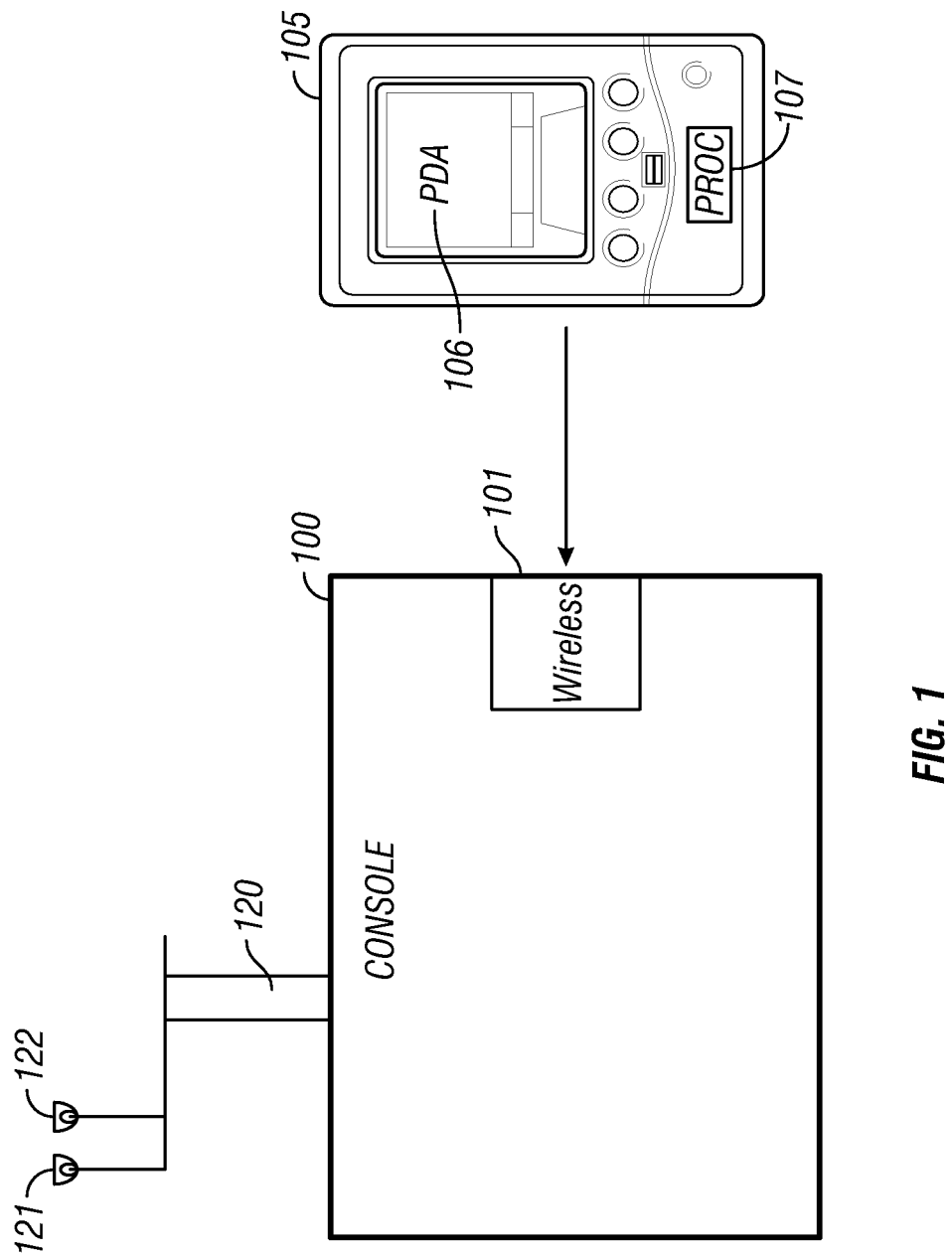
FIG. 1 shows a system diagram.
Figure 3:
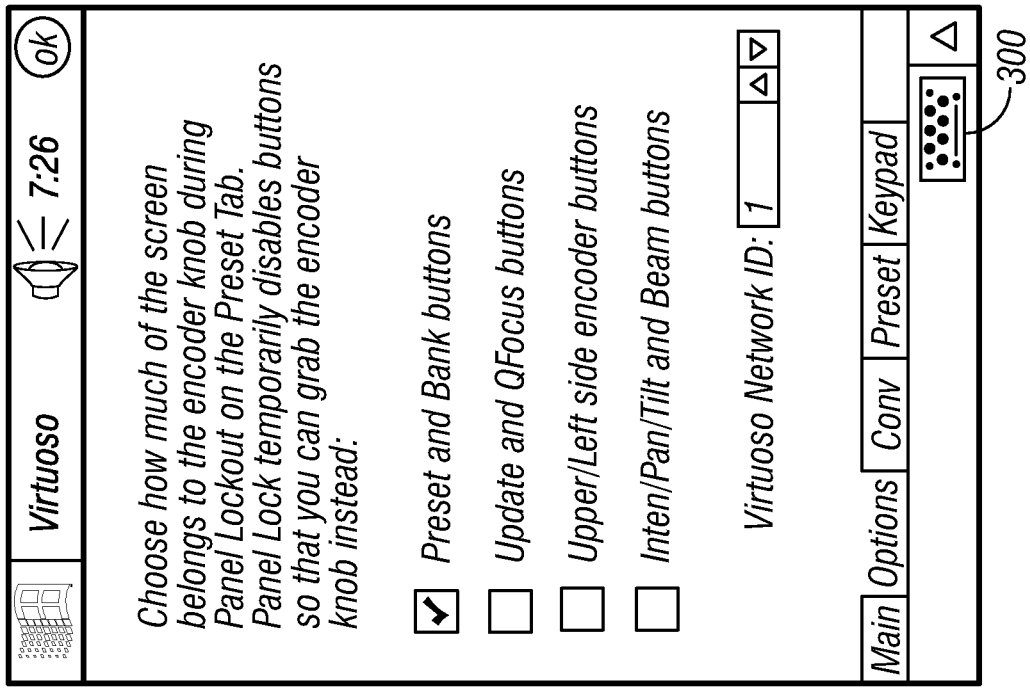
FIGS. 2-6 shows the user interface that is displayed on the display of the remote for the different tabs.

FIG. 1 shows a system embodiment using a direct wireless connection between a remote device such as a PDA 105 and the console 100. In the embodiment, the console includes a wireless interface unit 101 that can be for example a Bluetooth unit or WiFi unit such as a wifi router. The console itself is connected via one or more connection lines 122 plural different light projecting lamps, such as 121, 122. The connection line 120 may be a DMX line, or an Ethernet line, or may be a dedicated line sent to each of the different lamps. While only a single connection line 120 is shown, it should also be understood that there may be multiple such lines.

The remote operation allows a simplified control of functions that are controllable via the console 100. The control is carried out via a simplified user interface intended for and adapted for use over the specific user interface.

Figure 2:
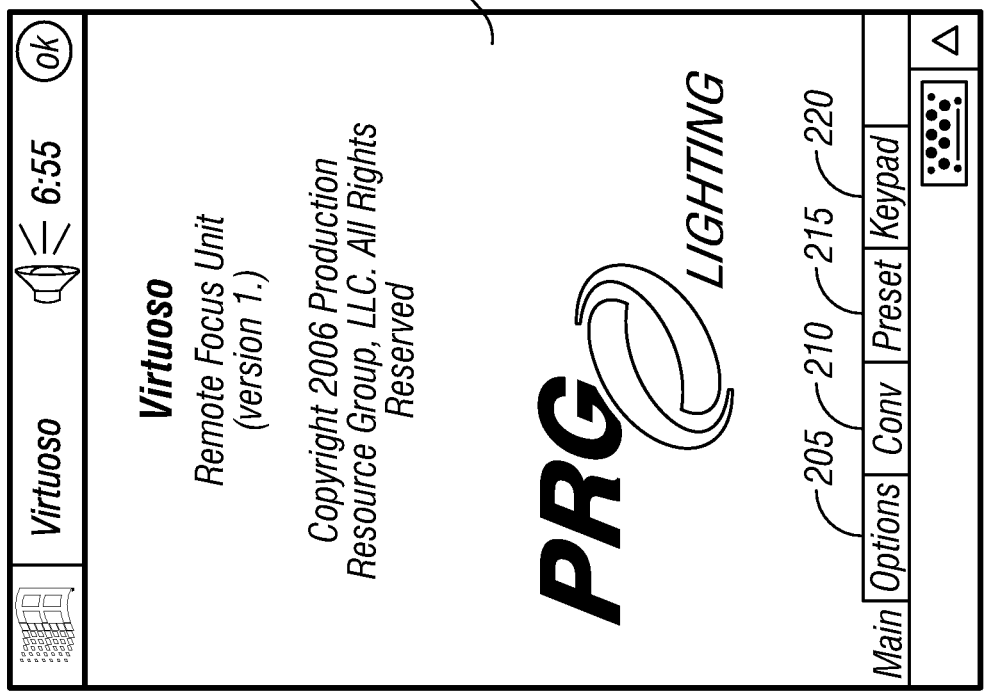

In the embodiment, the screen 106 of the PDA 100 displays a simplified user interface. FIG. 2 illustrates an exemplary simplified interface that uses a tabbed graphical user interface to control a reduced set of the most common controls carried out on the console. For example, FIG. 2 illustrates the interface, with display information 200, but also illustrates other tabs which can be selected. The tabs may include the options 205 that allows setting whatever options are available to set via the remote control, conventional focus at 210, preset focus tab 215 and keypad tab 220 that includes many of the other commands, and also include a command line entry capability.

Many of the console commands can be entered via a command line entry 220, as long as the user knows and understands the right format for these commands. In an embodiment, the PDA 105 may be a device with a full keyboard, such as a Blackberry, thereby enabling facilitated entry of commands in this way. Another embodiment may also use a stylus with such a device.

Further detail on the different tabs as provided herein. When the options tab is selected, different performance aspects of the application can be selected. The embodiment uses checkboxes to control the amount of information that is 3 displayed on the screen. The checkboxes control how much area of the touch screen is dedicated to the user-interface-simulated encoder, for example that forms the middle of the preset screen described herein with reference to FIG. 5. This enables the same package to be used on multiple different PDA hardware devices. It also enables more delicate control over the encoder by providing and displaying the encoder as a larger area of the screen, to enable better control thereover.

For example, some user may want to be able to "grab" the encoder knob. The preset tabs allow disabling other functions so that touching anywhere on the screen selects, and hence 'grabs', that encoder. Other users may want to operate differently.

Other options may control use of cursor keys for control, to allow the user to focus their eyes on the lighting rig rather than on the screen of the handheld, if desired.

This mode goes into effect when the panel lock button 300 changes to a red color or is otherwise shown as being active. The portions of the screen which are locked by the panel lock become outlined in light red. The panel lock can be toggled by pressing the button directly.

In an embodiment, default setting is to only lock out the preset and bank buttons during panel lock.

The virtuoso network ID may allow setting between a specific remote focus unit and a console. This may allow different remote controls to control different consoles. Another embodiment allows all consoles to listen to all virtual focus units, thereby rendering.

Figures 4, 5:
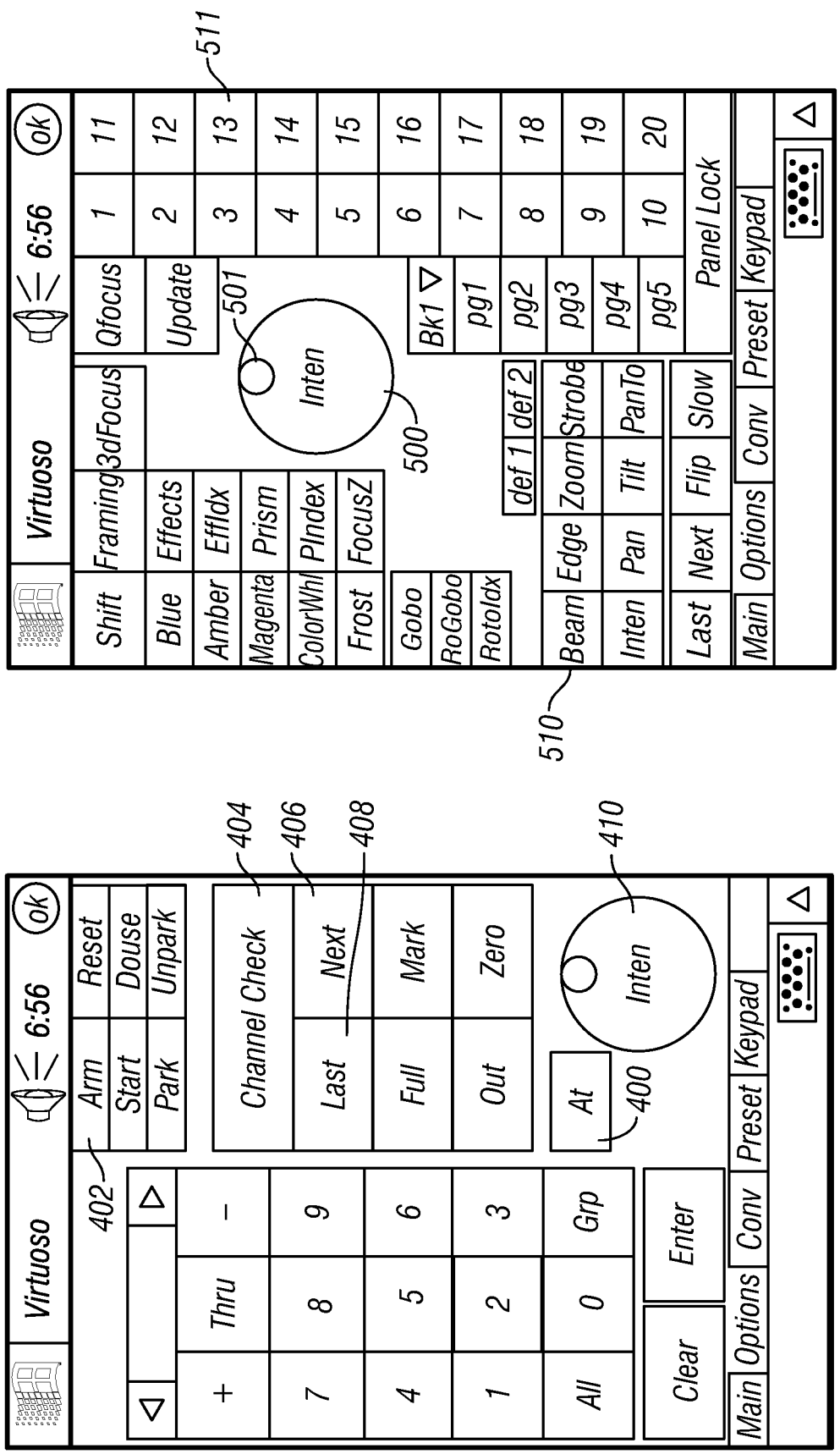
Figure 6:
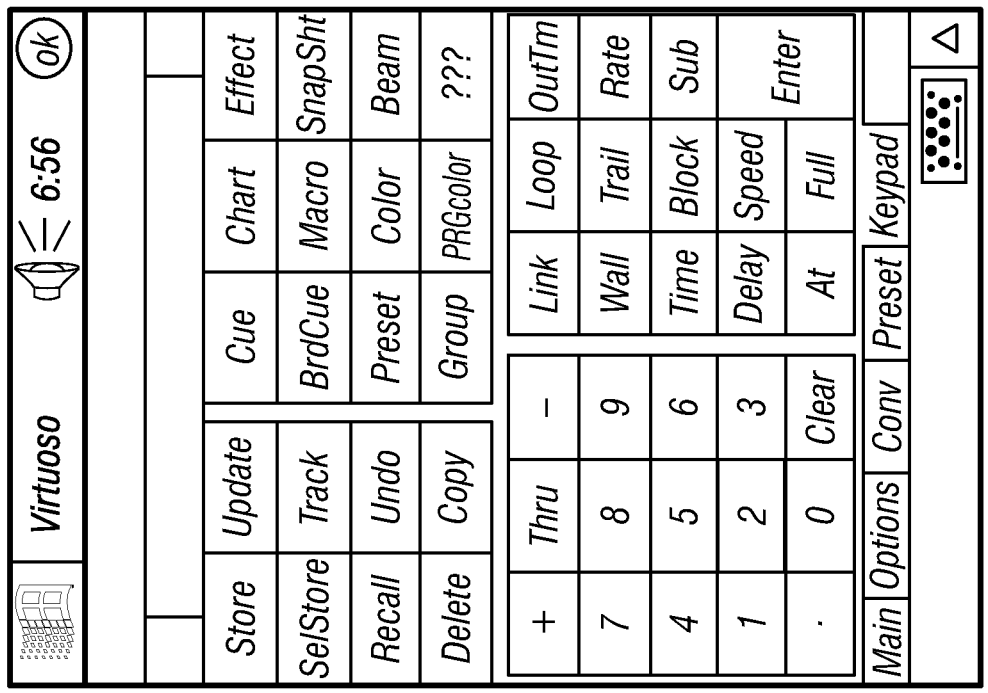

The conventional focus tab 210 brings up the screen shown in FIG. 4. This includes a selection that allows channel selection, start, douse and reset controls, park and unpark for the lights, and also allows intensity controls. In an embodiment, this may operate in a similar way to the operation of the console itself. However it may also include all keys and group keys.

Certain commands, such as the "at" command 400, is sent immediately when pressing the button, without needing the "enter" to be pressed. Other commands, such as those entered via the drop-down menu, are not executed until the enter is pressed.

There are certain controls that also prevent improper sending of information. For example, the Arm key 402 is normally off, but must be toggled on before reset or douse can be selected.

The channel check button 404 enables using the next and last buttons to change the intensity of the light. For example, when channel check is selected, the next button 406 goes to the next channel and carries out some changing the intensity of that next channel. When channel check is not selected, next 406 and last 408 only change the channels, and do not change the intensity of the light.

The system also includes a drop-down menu, and allows selection of intensity values in the drop-down menu. However, changing the drop-down value does not send a command: the at key is required to send the actual command.

The intensity encoder 410 is controlled by grabbing the encoder soft knob and dragging it using a stylus in a circular motion. On a PDA that only includes a trackball, the intensity can be grabbed and the trackball rolled to control change of intensity.

The preset focus tab is shown in FIG. 5. This includes an encoder section, next and last channel information as in the conventional focus, and an update enable and a preset palette. The preset palette allows quick focusing of certain lights using stored information.

For example, when the preset is set to update, all channels within a preset group are highlighted and selected, and the preset for those channels is recalled. The preset may be stored for example, on the main console 100.

At that point, selecting "next" allows going to the first channel, thereby highlighting the first channel and removing the highlight from all the other channels. The preset can be adjusted using the encoder buttons and the encoder soft knob 500. The preset allows changing the value of the focus. Each individual channel can be set in this way. After resetting all the channels, the update button is pressed, and the preset number is pressed to update that preset.

This system can be updated by using the encoder soft knob that adjusts as the PDA stylus is dragged around the encoder. Again this can be controlled using a stylus or using a trackball. When using the stylus, the black dot 501 is held by the stylus and dragged around to rotate the encoder. The encoder does not adjust when originally grabbed, only when the stylus is properly located on the black dot.

The encoder selection controls 510 provide quick access to all virtuoso parameters that allow switching between encoders with cursor keys on the PDA. This allows changing operations without looking down at the PDA for example for preset. This facilitates presetting a light to a specified focus while looking at the light, rather than at the PDA.

The different encoder buttons that can be selected in the encoder area 510 maps the encoder soft knob function to the specified parameter. Also, when an encoder button is clicked, the buttons such as 511 on the right side of the display are disabled. Again, as in others, panel lock can be enabled to lock out the other buttons. Update, focus or panel lock can reenable the buttons 511 on the right side of the screen.

One reason for blocking out the right side of the screen is so that the encoder knob can be grabbed from anywhere on the right side of the screen without danger of actuating one of the controls. Moreover, the enter key on the PDA, usually in the middle of the cursor buttons, selects the next channel in the current quick focus preset. Again this enables watching the lights rather than the PDA while performing quick focus.

Other encoder buttons are also used including a pan and tilt encoder which allows adjustment of pan and tilt controls on the light. When pan tilt is selected, the encoder knob no longer acts as a circular knob, but rather dragging in the x direction adjusts pan and dragging vertically adjusts tilt.

The "slow" button of toggles on and off to slow the action of the encoder in order to make minor adjustments.

The shift button remaps the encoder buttons to the corresponding shifted function of the console parameters. For example, the shifted function of the color wheel parameter spins the color wheel.

The "framing" button provides framing the encoder controls.

The "3-D focus" button remaps the pan, tilt and pan tilt buttons to x and y buttons, so that the light can be controlled using an alternative technique. The focus z encoder provides a 3-D z-axis.

The According to the embodiment, this system can be used to control different aspects of lights remotely. One advantage of this ability is that the user can move to a good location to see the lights, in order to do a more accurate job of controlling the lights. For example, focusing the light may require the user to move to a better vantage point in order to carry out a more accurate focus of those lights. The user can take the remote-control device, move to that vantage point, and set the focus of the light as a desired preset. Thereafter, that preset (even though entered via the remote) is stored in the console, and can be used by users of the console.

This allows the user to interactively change values of the focus and other values of the light from a remote location.

The keypad tab 220 is a summary tab that includes most of the keys available on the keypad. Most of these commands are identical to the keypad commands, and hence allows the keypad to be used as a summary keypad.

The virtuoso remote-control device may be an IP based device, and many require that a specified IP address, such as "192.168.1.2" be entered as the device address.

The console may use an external wireless access point, such as the Linksys (R) 504G wireless access point. The configuration of parameters from this access point may use conventional techniques. If multiple access points are used, they should be configured to use different channels and perhaps different characteristics.

Alternatively, a Bluetooth system may be used in a similar way.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other commands and command forms can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A device, comprising:
   a handheld unit, having at least a user interface and a display, said user interface having a capability of selecting items on said user interface, said handheld unit also including a processor that runs a stored program that produces a user interface display, and wherein said user interface display is formed with a plurality of tabs, each tab bringing up a complete separate screen, and each screen adapted for controlling a different aspect on a remote console that controls a plurality of moving lights, and at least one of said tabs including a display of a controlling encoder, that can be rotated to change a control amount of a function on said remote console, to correspondingly change said control amount on a controlled light.

2. A device as in claim 1, wherein said program also enables controlling plural different preset amounts for plural different controlled lights.

3. A device as in claim 2, wherein said preset amounts can be controlled by a user, and allow presetting a parameter on controlled lights, and controls said controlled lights to the preset value after said preset.

4. A device as in claim 1, wherein said encoder can be rotated using controls on the user interface to rotate the position of the encoder.

5. A device as in claim 4, wherein said rotating comprises selecting a specified portion of the encoder that controls rotating, and enabling rotating the encoder after selecting that portion.

6. A device as in claim 5, wherein said rotating comprises moving a stylus across a screen of the handheld unit in a circular motion including a first circular motion for a first direction of operation of the encoder and a second circular motion for a second operation of the encoder.

7. A device as in claim 4, further comprising changing a mode of control of the encoder, to control an x,y mode of the encoder, in which the encoder is dragged in an x-direction and in a y direction.

8. A method, comprising:
communicating from a remote control device to a lighting console wirelessly, said communicating comprising sending commands from said remote control device, which commands operate for controlling a plurality of lights, said commands controlling at least focus of the lights and control of movement of the lights in orthogonal directions;
running a program on said remote control device that enables controlling a plurality of lights by sending values to the lighting console that is used to control said lights;
wherein at least one of said controls includes preset focus values for said lights that can be controlled by control from the remote device.

9. A method as in claim 8, wherein at least one of said controls is controlled by providing a picture of an encoder on a user interface, and enabling rotation of the encoder to change a value associated with the lights.

10. A method as in claim 8, wherein said program on said remote control device includes plural different features in tabs that can each be selected, each tab enabling a separate screen to carry out functions associated with the each tab.

11. A method as in claim 8, further comprising enabling a function which allows some of the controls to be used and others of the controls to be unused.

12. A method as in claim 9, further comprising enabling disabling other functions on the user interface, and controlling the encoder by selecting areas on the user interface previously associated with said other functions on the user interface.

13. A method as in claim 8, further comprising storing focus controls entered on said remote control.

14. A method, comprising:
storing a plurality of focus values for a plurality of remote lights in a controlling console as preset values of focus;
receiving wirelessly communications in said controlling console from a standalone remote control device;
receiving a selection of at least one of said preset values for at least one of said focus controls from said remote control; and
based on said receiving a preset value, using said focus values to control said remote lights as a preset value for said remote lights.

15. A method as in claim 14, wherein said enabling setting comprises displaying a user interface picture of an encoder, and allowing the user to rotate the encoder on the remote-control device.

16. A method as in claim 15, wherein said rotate comprises moving a stylus across a screen of the handheld unit in a circular motion including a first circular motion for a first direction of operation of the encoder and a second circular motion for a second operation of the encoder.

17. A method as in claim 16, further comprising changing a mode of control of the encoder, to control an x,y mode of the encoder in which the encoder is dragged in an x-direction and in a y direction.

* * * * *